UNITED STATES PATENT OFFICE.

JAMES RUSHWORTH, OF AURORA, INDIANA.

BELT SHIFTER.

1,404,897. Specification of Letters Patent. Patented Jan. 31, 1922.

Application filed March 5, 1920. Serial No. 363,395.

*To all whom it may concern:*

Be it known that I, JAMES RUSHWORTH, a citizen of the United States, and residing at Aurora, in the county of Dearborn and State of Indiana, have invented a new and useful Improvement in Belt Shifters, of which the following specification is a full disclosure.

My invention relates to an improved belt shifting mechanism.

The object of the invention is to provide a very simple, inexpensive, compact and efficient mechanism which will accurately shift the belt in predetermined steps in relation to opposing pulley cones.

Another object of the invention is to provide this mechanism and its actuator in a structural form readily applicable to machines, counter-shafts or the like, of whatever species, without being cumbersome or in positional interference with the machine elements.

The features of the invention are more fully set forth in the description of the accompanying drawings, forming a part of this specification, in which.

Figure 1:
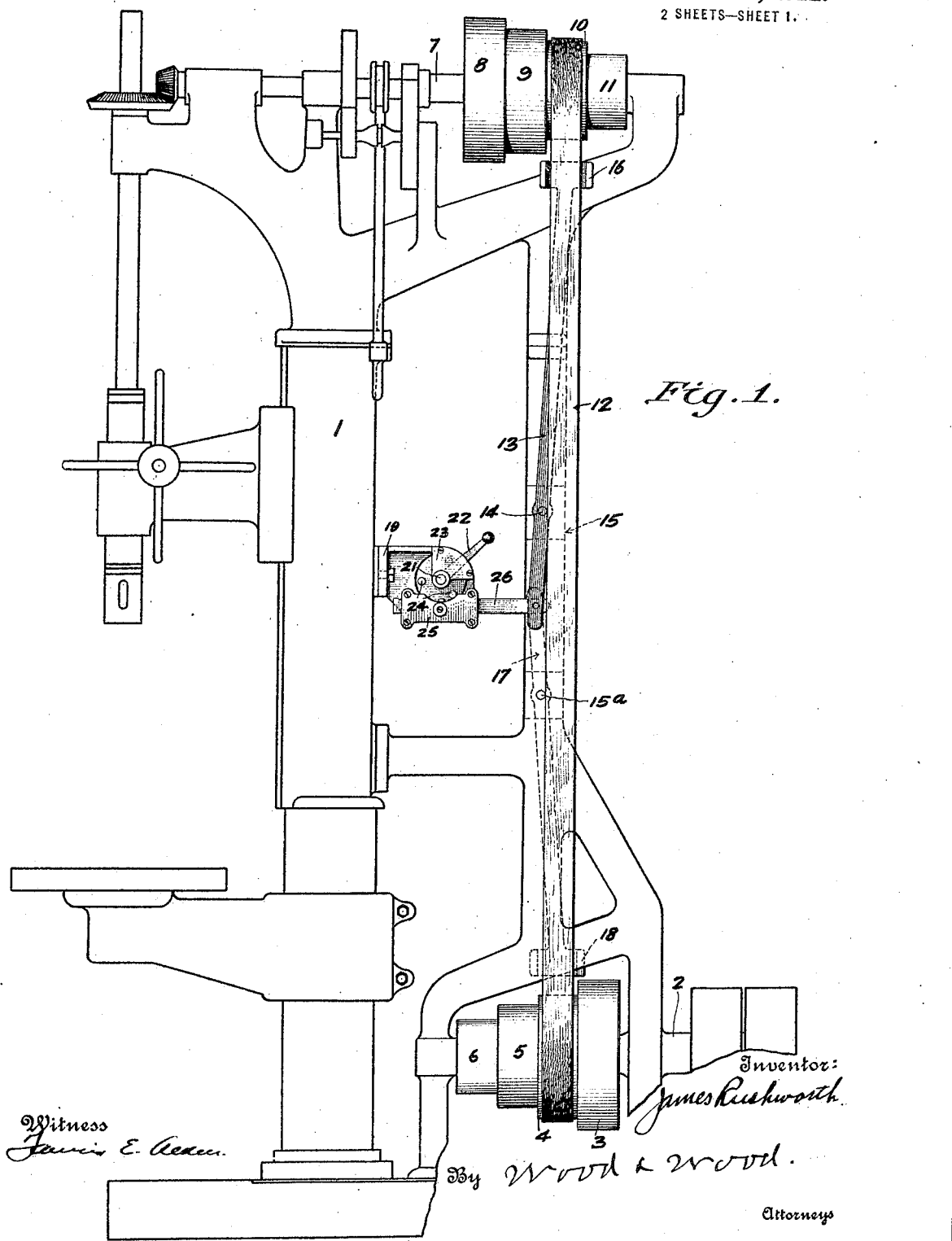
Figure 1 is a side elevation, showing my belt shifting mechanism as applied to a drill-press.

For the purpose of conveniently illustrating the principle of the invention, the drawings show my improved mechanism as applied to a drill-press, and of course this constitutes a mere matter of disclosure and not of limitation.

In the drawings, 1 represents the drill-press column, which may for the purpose of this invention simply be considered a machine element, in relation to which, 2 will be the driving shaft having the cone pulley comprising the steps 3, 4, 5 and 6, or as many more or less as may be desired, and 7 the driven shaft comprising the opposing pulley steps 8, 9, 10 and 11, the belt 12 being positioned on the appropriately opposing pulley steps 4 and 10. The belt shifting lever 13 for the upper end of the belt is pivoted at 14 on the machine element 15, and it has a belt embracng terminal 16 at the upper end for shifting that end of the belt. The lower end of the belt is manipulated by a similar lever 17 pivoted at 15ª, and having the belt embracing terminal 18, these respective terminals, of course, being positioned as closely as possible to the respective pulley cones.

Figure 2:
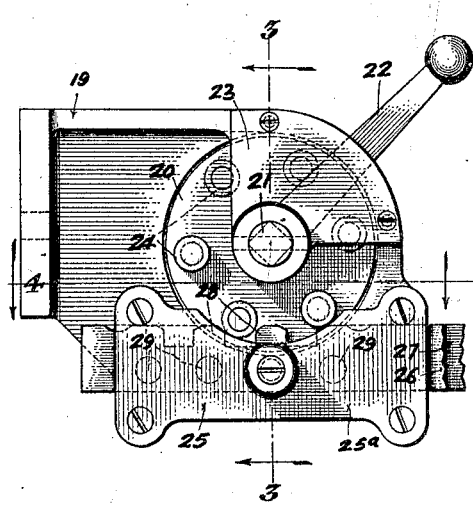
Figure 2 is a side elevation of the lever-operating mechanism.
Figure 3:
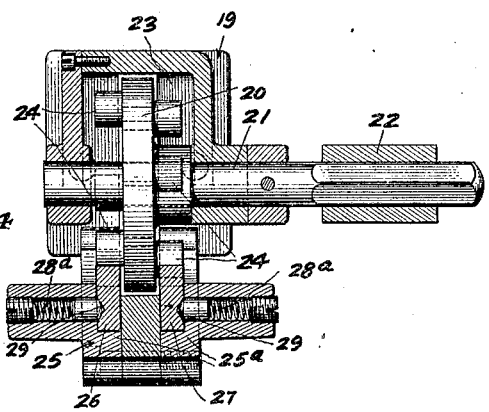
Figure 3 is a vertical transverse sectional view on the line 3—3 of Figure 2.
Figure 4:
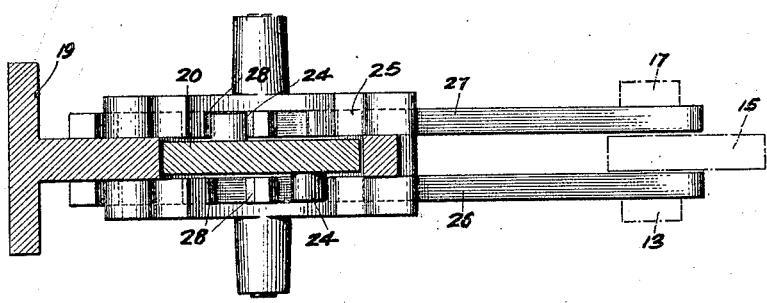
Figure 4 is a horizontal sectional view on the line 4—4 of Figure 2.

The actuator for manipulating these levers 13 and 17 in relatively timed step movements, is shown in detail in Figs. 2 and 3, and it comprises a bracket 19 bolted to the machine element 1, which constitutes a mounting for a portion of the actuating elements, that is to say, the prime actuating disk 20 is fixed to a shaft 21, which has bearings in said bracket 19 and it is rotated by the crank handle 22. The upper portion of this bracket 19 forms a U-shaped housing 23 for this disk, and as will be seen, three rack shifting studs 24 project from the opposite faces of this disk and are housed within the frame 23, there being four steps in the cone selected for the illustration, involving three shift movements. There are three of these shifting studs 24 on each side of the disk, corresponding with the three movements with the upper end of the belt functioned by the studs on one side of the disk, and the three steps for the other end of the belt, functioned by the three studs on the other side of the disk.

It will also be appreciated that these studs have to be definitely placed in positional relation to one another and to the racks which they are to operate to correspond with the relative time intervals or steps of the belt shift and with the length of such steps.

From the lower portion of this frame housing 23 is dependably supported a secondary frame or housing 25 for supporting and guiding the racks, this member 25 being shown in Figs. 2 and 3, and having appropriate guides 25ª for the right and left hand racks 26 and 27, each of which has three rack teeth 28 corresponding appropriately with the shift studs 24.

Also, preferably, this member 25 carries right and left hand spring detents 28ª to automatically latch into the appropriate rack indents 29, to assist in properly positioning and functioning the appropriate rack notches and rack shifting studs. The rack 26 is pivotally connected to the lower end of the belt shifting lever 13, the rack 27 is pivotally connected to the upper end of the lower belt shifter 17, sufficient play being provided in the joint of the connected parts for free arc movement of the levers.

Assuming that the belt is on the pulley members 8 and 6, appropriate rotation of the crank 22 will first shift the upper end of the belt, causing it to step down on number 9, and the next movement of the crank will shift the lower member 17, causing the lower end of the belt to step up into the pulley member 5. In like manner, another movement of the crank in the same direction will first step down the upper end of the belt from pulley 5 to 4, and so on, while appropriate movements of the crank in rotating the disk in the opposite direction will alternately shift the upper and lower ends of the belt in reverse direction, the belt always first stepping down at one end to create the slack and then stepping up at the other end automatically, and as regards the shifting of the belt in either direction.

Having described the invention, I claim:

1. In combination with driving and driven pulley cones, belt, the machine to be driven, a belt shifting lever for each end of the belt movably secured to the machine element, means for alternately operating said belt shifters in alternate step movements, comprising a mounting suitably secured to the machine element, a pair of racks guidably supported in said mounting and connected appropriately to the two belt shifters, each rack having a number of rack teeth or notches corresponding to the number of steps at one end of the belt, a disk journaled in said mounting and being provided on each side with a series of rack shifting teeth or pins corresponding in position and number with the rack teeth, and means for rotating said disk, whereby in either direction or rotation there is a step-down at one end of the belt and then a step-up at the other end of the belt.

2. In combination with driving and driven pulley cones, belt, the machine to be driven, a belt shifting lever for each end of the belt movably secured to the machine element, means for alternately operating said belt shifters in alternate step movements, comprising a mounting suitably secured to the machine element, a pair of racks guidably supported in said mounting and connected appropriately to the two belt shifters, each rack having a number of rack teeth or notches corresponding to the number of steps at one end of the belt, a disk journaled in said mounting and being provided on each side with a series of rack shifting teeth or pins corresponding in position and number with the teeth of said pair of racks, means for rotating said disk, whereby in either direction of rotation there is a step-down at one end of the belt and then a step-up at the other end of the belt, and an automatic indent and detent mechanism to position the rack teeth in relation to the actuating disk pins.

3. A belt shifter comprising oppositely extending levers for respectively engaging the belt, lever actuating rack bars extending transversely of and each connecting with a respective lever, a frame for slidingly supporting said bars, and a rotative member journaled in said frame engaged with said rack bars for successively moving said bars, for shifting one lever advancedly over the other in the same direction.

4. A belt shifter comprising a pair of levers extending respectively to engage a belt at opposite points, levers actuating rack bars, each connecting with a respective lever, a stationary support for said bars, and a rotative member journaled on said frame for actuating said bars successively, for moving one end of the belt in advance of the opposite end in determined belt shifting degrees.

5. A belt shifter comprising a pair of levers, having belt engaging ends relatively extending in opposite directions, a pair of parallel rack bars, each connecting with a respective lever, a frame for supporting said rack bars, and a rotative transmission member cooperative with both rack bars for successively moving said rack bars in belt shifting steps for swinging one lever in advance of the other, whereby one end of the belt is shifted in advance of the opposite end thereof.

6. A belt shifter comprising a pair of levers engaging with the belt relatively at opposite sides and ends, a pair of rack bars each connecting with a respective lever, a frame for supporting said bars, and means for actuating said bars intermittently alternately for step shifting of the belt one end in advance of the other.

In witness whereof, I hereunto subscribe my name, as attested by the two subscribing witnesses.

JAMES RUSHWORTH.

Witnesses:
W. R. Wood,
L. A. Beck.